US006793395B1

(12) United States Patent
Studemann et al.

(10) Patent No.: US 6,793,395 B1
(45) Date of Patent: Sep. 21, 2004

(54) BEARING ARRANGEMENT FOR MACHINE TOOL SPINDLES

(75) Inventors: Bernd Studemann, Monchengladbach (DE); Norbert Hennes, Borheim (DE)

(73) Assignee: DS Technologie Werkzeugmaschinenbau GmbH (DE)

( * ) Notice: Subject to any disclaimer, the term of this patent is extended or adjusted under 35 U.S.C. 154(b) by 30 days.

(21) Appl. No.: 10/030,954

(22) PCT Filed: Jun. 29, 2000

(86) PCT No.: PCT/EP00/06044

§ 371 (c)(1),
(2), (4) Date: Apr. 3, 2002

(87) PCT Pub. No.: WO01/03882

PCT Pub. Date: Jan. 18, 2001

(30) Foreign Application Priority Data

Jul. 8, 1999  (DE) ......................................... 199 31 936

(51) Int. Cl.$^7$ .............................................. F16C 32/06
(52) U.S. Cl. ....................................................... 384/101
(58) Field of Search ................................. 384/101, 100, 384/114, 107, 115

(56) References Cited

U.S. PATENT DOCUMENTS

| | | | |
|---|---|---|---|
| 3,642,331 A | 2/1972 | Silver | |
| 3,708,215 A | 1/1973 | Wilcock et al. | |
| 3,854,781 A | 12/1974 | Bildtsén | |
| 4,092,048 A | 5/1978 | Bennett, Jr. et al. | |
| 4,545,741 A | * 10/1985 | Tomioka et al. | ............ 384/101 |
| 5,193,953 A | 3/1993 | Jesinger | |

FOREIGN PATENT DOCUMENTS

| | | |
|---|---|---|
| DE | 701555 | 1/1941 |
| DE | 2630740 | 10/1977 |
| DE | 3229128 | 2/1983 |
| DE | 3902907 | 8/1990 |
| DE | 4324140 | 1/1995 |
| EP | 0756095 | 1/1997 |
| GB | 1331542 | 9/1973 |
| GB | 2105416 A | 7/1982 |

OTHER PUBLICATIONS

V.V. Bushuev et al., "Spindle Assembly With Combination Bearing Supports", *Russian Engineering Research*, Allerton Press, New York, vol. 13, No. 2, 1993, pp. 85–93.

The Article Spindeleinheiten, abgestimmt auf den speziellen Anwendungfall (machine–tool spindles adapted to the particular field of application), (no date).

* cited by examiner

*Primary Examiner*—Lenard A Footland
(74) *Attorney, Agent, or Firm*—Ostrolenk, Faber, Gerb & Soffen, LLP

(57) ABSTRACT

The invention relates to a bearing arrangement for machine-tool spindles, consisting of a hydrostatic radial bearing and at least one radial/axial roller bearing.

4 Claims, 1 Drawing Sheet

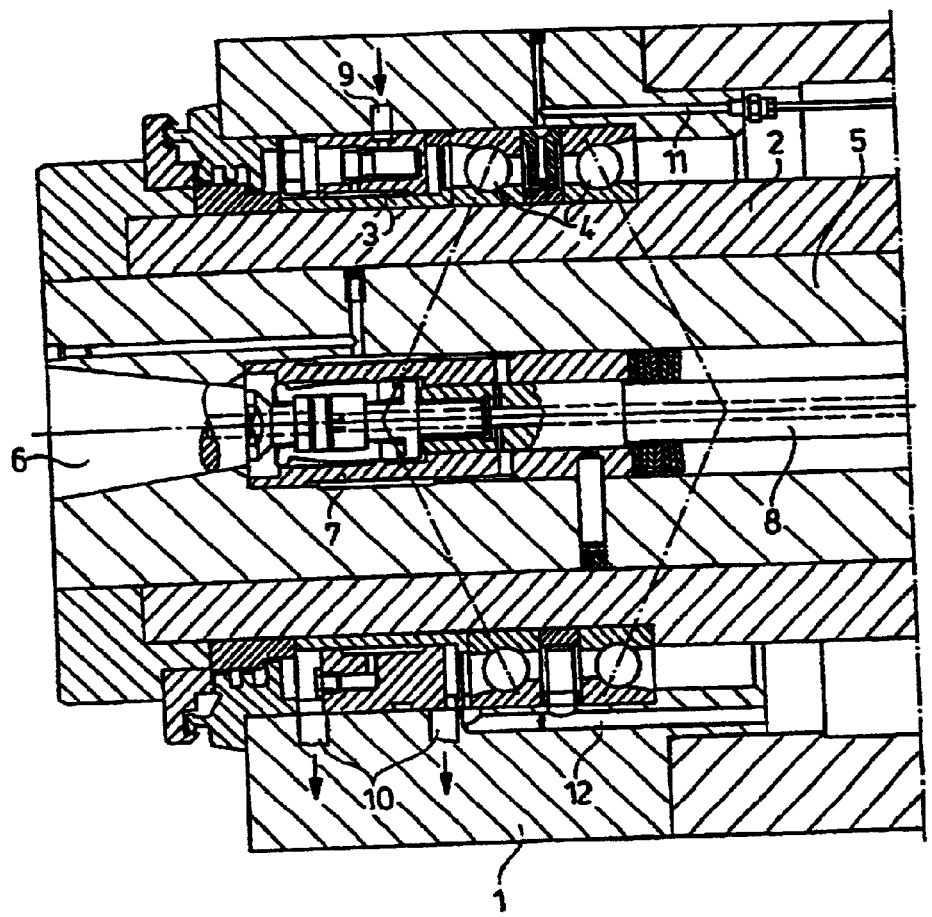

BEARING ARRANGEMENT FOR MACHINE TOOL SPINDLES

The invention relates to a bearing arrangement for machine-tool spindles.

Machine-tool spindles are mounted either in rolling bearings such as ball bearings or roller bearings; or in sliding bearings, in particular hydrostatic bearings.

Roller bearings have the advantage of low friction and hence low warming even at high speeds of rotation, but high local stresses between the rolling body and the rolling ring cause rough running, as a result of which vibrations are more easily transmitted or generated by the bearings themselves. Moreover, the circular running precision of roller bearings is, because of the roller bearing consisting of inner ring, rolling body and outer ring, extremely difficult to bring down to the low values required by modern machine tools. In order to avoid some of these disadvantages, it is known from DE 26 30740 A to dispose the outer rings of the roller bearings in hydrostatic bearings. This entails a substantial construction effort.

By contrast, very high circular running precisions can be achieved with a hydrostatic bearing, since only a few parts, specifically the shaft, the bearing bush and the housing bores, have to be produced. By lapping of the bores with a lapping mandrel, precise alignment, precise diameters and very high surface quality can be achieved. As a result of the lubricant film, vibration-damping running properties can be achieved, so that hydrostatic bearings can also be used for fine finishing work. Moreover, hydrostatic bearings are wear-free. A complete hydrostatic bearing system of this type is described in DE 43 24 140 A. As, however, a satisfactory hydrostatic mounting of a machine-tool spindle normally requires two axial and two radial hydrostatic bearings, a high pump rating is necessary in order to build up the necessary hydrostatic pressure in the bearing and achieve an adequate oil throughput without excessive warming. Moreover, cooling units are needed in order to keep the circulating lubricant oil and a uniform and acceptable temperature.

It is an object of the invention to provide a bearing arrangement that permits high circular running precision and good damping at a high cutting performance and high speeds of rotation without exhibiting the disadvantages of the known bearing arrangements.

On the basis of this object, a bearing arrangement for machine-tool spindles is proposed which, according to the invention, consists of a hydrostatic radial bearing in the region of the tool end of the spindle and at least one radial/axial roller bearing disposed parallel thereto. The hydrostatic radial bearing ensures high circular running precision, an extremely rigid bearing system, good damping and a high degree of freedom from damage caused by radial shocks.

The invention is based on the concept that the known properties of a hydrostatic bearing system are substantially desirable in the radial direction, whereas in the axial direction the guidance w provided by radial/axial bearings is sufficient. Moreover, the advantageous properties of a hydrostatic bearing system produce their effects substantially in the region of the tool end of the spindle, so that this is also the only region in which a hydrostatic radial bearing must be disposed.

If at least one radial/axial roller bearing is disposed parallel and adjacent to the hydrostatic radial bearing, while further radial roller bearings are disposed at the end of the spindle remote from the tool holder of the spindle, high speeds of rotation can be achieved without excessive increases in the pump and cooling ratings, since, by comparison with complete hydrostatic mounting with two radial and two axial bearings only a quarter of the pump and cooling rating is required. By contrast, the necessary oil supply to the roller bearings is negligible, since these are lubricated and cooled only by means of an oil mist that operates using small quantities.

Preferably, two parallel radial separable ball bearings for axial loads in both directions can be disposed adjacent to the hydrostatic radial bearing on the side of the hydrostatic radial bearing remote from the tool holder of the spindle, these roller bearings effecting, by comparison with the conventional roller bearings, a substantial improvement in the rigidity in the axial direction, as they can be produced with a pressure angle of 25° instead of the customary 15°.

If the machine-tool spindle is drivable at different speeds of rotation, for example a low speed of rotation for heavy-duty cutting using large, heavy milling heads, for which good damping is important, a moderate speed of rotation for the finishing work, again using large, heavy milling heads, for which a high degree of circular running precision is necessary, and a high speed of rotation for the production of bores by means of drills which have a relatively small diameter or for simple milling work using small-diameter ball-headed milling cutters, it is advantageous if the bearing arrangement is so formed that the hydrostatic radial bearing is active only in the lower and, optionally, moderate rotational speed ranges, but not in the high rotational speed range. In this case, although the advantages of the hydrostatic mounting, such as good damping, high circular running precision and extremely rigid mounting, are lost in the high rotational speed range, those properties are not absolutely necessary when producing bores of up to 15 mm diameter and when milling using small-diameter ball-headed milling cutters.

The hydrostatic mounting can be made inoperative in a simple manner by interrupting the hydraulic oil supply. This can be achieved, for example, by an automatic switching apparatus which interrupts the hydraulic oil feed to the hydrostatic radial bearing above a pre-settable speed of rotation, the hydrostatic radial bearing preferably being simultaneously subjected to the action of compressed air in order to blow out the oil present in the hydrostatic radial bearing.

The invention is explained in detail below with reference to an example of embodiment shown in the drawing.

All that is shown of a machine tool is the tool-end region of a milling sleeve 2 rotatably mounted in a beam 1, which is axially displaceable within a spindle case (not shown), with a spindle 5 that is axially displaceable but not rotatable within the milling sleeve 2. The milling sleeve 2 and the spindle 5 jointly constitute a main machine-tool spindle 2, 5.

The milling sleeve 2 is mounted in the beam 1 by means of a hydrostatic bearing 3 and, adjacent thereto, by means of a pair of parallel radial separable ball bearings 4.

The spindle 5 has a quick-release taper holder 6 at its end, into which a corresponding quick-release taper of a milling head or of a drill can be introduced and secured by means of an automatic tool clamping device 7. This automatic tool clamping device 7 is actuated by means of a coaxial connecting rod 8 in a known manner in order to retain or eject a tool. For heavy-duty cutting at a low speed of rotation of approximately 300 $\text{min}^{-1}$ a heavy, large milling head is secured, in the illustrated position of the spindle 5 relative to the milling sleeve 2, on the main machine-tool spindle 2, 5 formed therefrom, the torque transmission to the milling head being provided exclusively via a positive coupling to the milling sleeve 2. The necessary advance is effected by axial displacement of the beam 1 in the spindle case (not shown). Finishing work with high circular running precision can be performed at a speed of rotation of approximately 1200 $min^{-1}$.

For lighter drilling and milling work with tools of small diameter at a speed of rotation of approximately 3200 $min^{-1}$, the spindle 5 can be displaced axially, the spindle 5 having a substantially smaller diameter than the beam 1 and therefore being capable of introduction into substantially smaller apertures or bores of the workpiece to be machined.

Hydraulic oil is fed to the hydrostatic bearing 3 via a hydraulic oil feed 9, and the outflow of oil is effected by oil outlets 10. This outflowing oil is passed through a cooling device (not shown) and then passes in turn to a pump (not shown). The mode of operation of hydrostatic bearing systems is known and need not be explained in detail.

It should be noted with regard to this hydrostatic bearing system that it operates with a high total gap of approximately 100 $\mu$m and that a high-volume flow of oil is passed to the hydrostatic bearing system 3 via flow control valves. As a result, the oil pressure is immediately increased on the bearing side, where an impact occurs, for example as a result of a tool being knocked against a workpiece, which is immediately absorbed thereby. In this manner, the roller bearings 4 are protected against shocks and the maintenance and repair effort is reduced.

Cooling and lubricating oil is fed to the roller bearings 4 via an oil feed 11, which is sprayed as an oil mist against the ball. This oil is fed back again to the oil pump via an oil outlet 12 in the beam 1.

What is claimed is:

1. A bearing arrangement for machine tool spindles, which comprises:

a hydrostatic radial bearing positioned in the region of the tool end of the spindle;

a first radial/axial rolling bearing arranged parallel and adjacent to the hydrostatic radial bearing;

a second radial/axial rolling bearing disposed toward the opposite end region of the spindle, away from the tool end; and a switching device, which automatically interrupts hydraulic oil feed to the hydrostatic radial bearing above a presettable speed of rotation.

2. The bearing arrangement of claim 1, wherein the automatic switching device comprises apparatus for supplying compressed air and for directing the compressed air to the hydrostatic radial bearing at a location to blow out hydraulic oil present at the bearing for inactivation of the radial bearing.

3. The bearing arrangement of claim 1, further comprising a beam, the tool being disposed in the beam and the bearings being between the beam and the spindle for enabling rotation of the spindle in the beam.

4. The bearing arrangement of claim 3, wherein the tool spindle includes a milling sleeve toward the tool end of the spindle and the milling sleeve being around the spindle and inside the beam.

\* \* \* \* \*